July 16, 1963   R. DOYLE   3,097,915
METHOD FOR OBTAINING IMPROVED FILM
Filed May 20, 1959
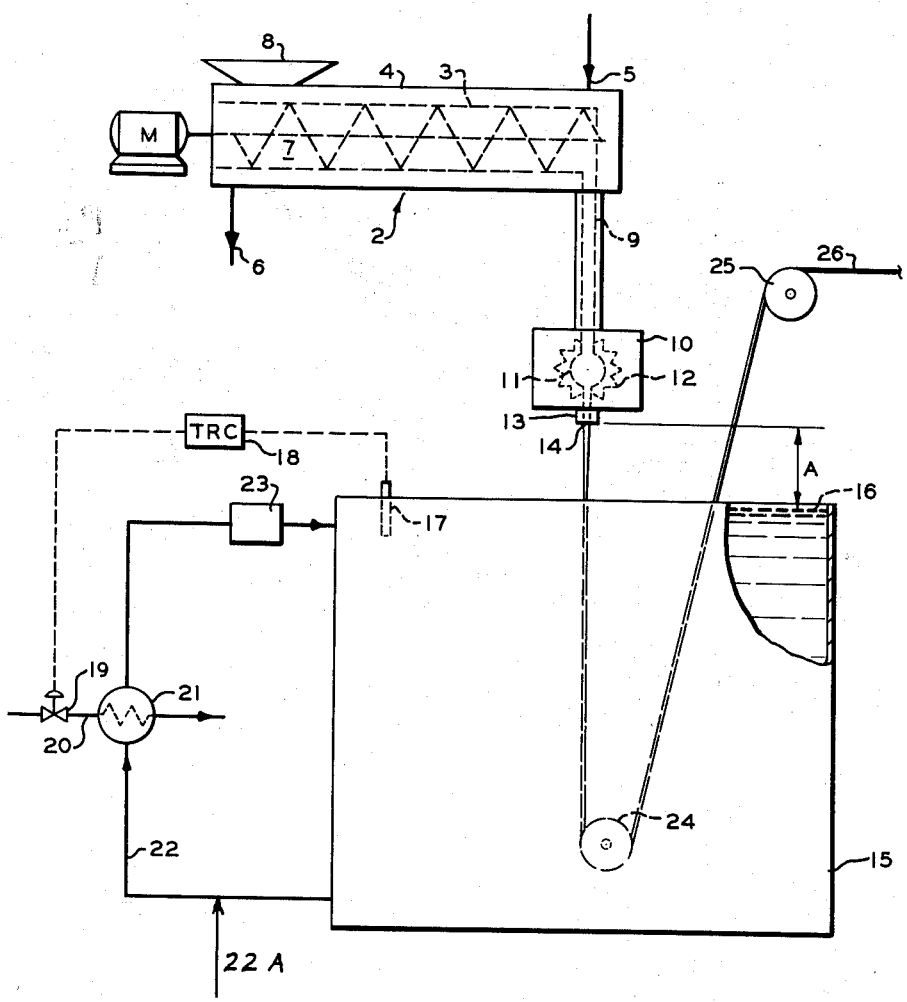
INVENTOR.
ROBERT DOYLE
BY
Hudson and Young
ATTORNEYS ID
3,097,915
METHOD FOR OBTAINING IMPROVED FILM
Robert Doyle, Bartlesville, Okla., assignor to Phillips Petroleum Company, a corporation of Delaware
Filed May 20, 1959, Ser. No. 814,607
6 Claims. (Cl. 18—57)

This invention relates to an improved method for obtaining thermoplastic film. In one aspect, it relates to an improved method for the production of extruded film. In another aspect it relates to a method for eliminating surface blemishes from film.

In my copending application Serial No. 725,461, filed March 10, 1958, and incorporated herein by reference, I have disclosed and claimed a method whereby an improved, highly transparent film of high-density polyethylene can be obtained. This method involves the quenching of extruded film by immersion in an inert fluid maintained at a temperature in the critical range 135 to 160° F.

I have now found that further improvements in extruded thermoplastic film, especially a film produced from high-density polyethylene, can be obtained by eliminating suspended solid materials from the liquid utilized to quench the extruded film.

An object of this invention is to produce a thermoplastic film having improved surface characteristics. A further object is to produce a high-density polyethylene film having improved appearance. Another object is to eliminate scratches and other surface blemishes from high-density polyethylene film. Other objects and advantages of this invention will become apparent to those skilled in the art upon reading this disclosure.

I have found that when polyethylene is extruded and quenched in a water bath operated as hereinbefore described, the film is often marred by the presence of white marks and scratches on the surface. I have observed that this phenomenon occurs even when conventional water softening methods have been applied to the water used in the quench bath. In some instances, I have scraped the white deposits from the surface of the polyethylene and found that they contained magnesium compounds. The avoidance of these surface blemishes upon polyethylene film is desirable.

In accordance with this invention, I eliminate the presence of these surface blemishes by maintaining the liquid quench bath free of suspended solids. The removal of these solids is usually effected by the use of a filter. However, other methods can be used, as will be recognized by those skilled in the art.

It is emphasized that the surface blemishes with which the present invention principally deals do not appear to be attributable to the embedding of dark-colored suspended solids in the polyethylene film. The blemishes which are eliminated by this invention include microscopic and larger scratches as well as white marks which, as previously described, appear upon such films in the absence of the practice of my invention. While I do not intend to be limited by any theory of operation of my invention, it is believed possible that the presence of suspended solid matter, such as fine particles of rust, in the liquid quench bath, may scratch the surface of the polyethylene film, and certain minerals which may be present in the quench liquid can then deposit in these scratches.

Reference is made to the accompanying drawing which represents a diagrammatic flow sheet illustrating one embodiment of my invention.

As shown in the drawing, the numeral 2 designates, generally, an extruder comprising an inner barrel 3 positioned within a jacket 4 to which a heat transfer fluid such as hot oil is supplied through inlet 5 and withdrawn through outlet 6. A motor-driven worm or helical conveyor 7 forces granular polyethylene which is supplied from hopper 8 to the barrel 3 into a passageway 9. A die 10 is connected to the extruder at its outlet end and is constructed to form an inner cavity 11 which can be heated by a suitable heater 12, for example, an electrical heating element connected to a source of electric power, not shown. Dies of this type are often referred to as slot extrusion dies. The view of the die in the drawing is an end view in section. The die is constructed with a die face 13 and a slot or opening 14 which is elongated in a direction perpendicular to the page, so that the molten polyethylene extruded therethrough has the general form of a thin sheet or film. Dies of this type are well known in the art and no further description thereof is necessary at this point. The numeral 15 generally designates a cooling bath indicating a suitable liquid coolant, the surface of which is indicated by the numeral 16. The coolant utilized can be any liquid which is both physically and chemically inert toward the polyethylene film, i.e. a liquid which neither dissolves, plasticizes, hardens, softens nor chemically reacts with the polyethylene film. A suitable bath liquid often preferred is water. Where a higher boiling liquid is desired, ethylene glycol or the polyethylene glycols, e.g. diethylene glycol and/or their lower alkyl ethers, can be utilized. Though not shown in the drawing, any suitable circulation or agitation means which can be used to stir the quench liquid and prevent local overheating without undue turbulence can be utilized. The quench liquid can be maintained at the desired temperature by withdrawal of a stream thereof through conduit 22, passage through heat exchanger 21 and return to the water bath 15. The numeral 17 represents a temperature-detecting or thermostatic element of any type known in the art, e.g. a bimetallic strip, a thermocouple junction, or a mercury thermometric element. The numeral 18 refers to a temperature recorder-controller, the structure and details of which are well known to those skilled in the instrumentation art and need no further description at this point. Numeral 19 refers to a motor valve such as a diaphragm-operated valve in conduit 20 which supplies heating fluid to the indirect heat exchanger 21. As will readily be understood by those skilled in the art, the temperature of the quench bath can be maintained by adjusting thermostatic element 17 and temperature recorder-controller 18 so that motor valve 19 is regulated to supply the proper amount of heating fluid to conduit 20 and heat exchanger 21 to heat the contents of conduit 22 to the desired extent. Numeral 22A indicates an inlet through which make-up quench fluid can be added to make up for evaporation and other losses. The numeral 23 indicates a filter, which represents one important feature of this invention and which is utilized to remove suspended solids from the liquid which is circulated from quench bath 15 through heater 21 and back. Numeral 24 indicates an idler roll which is immersed in the quench liquid. Numeral 25 designates another idler roll over which the quenched film 26 is passed to further processing means and final collecting means not shown in the drawing. Such means are well known to those skilled in the art.

Polyethylene, suitably in a granular or pelleted form, can be supplied to the hopper 8 and fed into extruder 2, which compresses and melts the polyethylene and then supplies it to the die 10. A preferred type of polyethylene for the practice of this invention is one which has a density of at least 0.940 and generally in the range 0.940 to 1.000 gram per cc. It is further preferred that the polyethylene have a melt index in the range 0.5 to 25. The temperature of the molten polyethylene in the system shown in the drawing is sufficiently high to permit extrusion, but is below the decomposition point. The extruded film of polyethylene emerges from the die slot 14 and is stretched longitudinally, by means not shown in the drawing, prior to entering the liquid in the quench bath 15.

The stretching or drawing can continue for a short time after immersion in the bath. The bath 15 is maintained at a temperature in the range 135 to 160° F., preferably 140 to 155° F., by the heating system previously described herein. The distance A from the die face to the surface of the quench liquid should generally be maintained at about ¼ inch. Tension is exerted on the quenched polyethylene film by means not shown, and film is drawn over the idler rolls 24 and 25 so that a draw-down ratio (diminution in thickness) in the range 5:1 to 100:1 is produced. The distance A and the width of the die slot 14 are greatly exaggerated in the drawing for purposes of illustration. Numerous mechanical details have been omitted from the drawing for purposes of clarity and can readily be supplied by those skilled in the art.

The quenched polyethylene 26 can be subjected to further treatment, such as annealing, as more fully described in my cited copending application.

As previously indicated, an important feature of my invention is the filtration of the quench bath liquid through filter 23. The drawing illustrates a preferred arrangement wherein the heated quench bath liquid leaving heat exchanger 21 is passed through filter 23 prior to return to the main quench bath 15. Other apparatus arrangements will become apparent to those skilled in the art. The invention is not limited to the specific embodiment shown in the drawing. While the invention has been described chiefly in connection with the production of transparent films from high-density polyethylene, the invention is not limited thereto but is generally applicable to the production of extruded film from thermoplastic materials in general.

In a specific embodiment of my invention utilizing a system similar to that shown in the drawing, a polyethylene produced by the polymerization of ethylene in the presence of a chromium oxide-silica-alumina catalyst in which part of the chromium is hexavalent, is fed into hopper 8 as cylindrical pellets approximately ⅛ inch long and ⅛ inch in diameter. This polyethylene has a density of 0.960 gm./cc. and a melt index of 5.0. The polyethylene is melted in extruder 2, and the melt is maintained at a temperature of 425° F., measured at approximately the position of the numeral 9 in the drawing. The bath 15 is filled with water taken from a municipal water supply and is maintained at a temperature of 140° F. The temperature is maintained by withdrawing a stream through a conduit 22 as shown in the drawing and passing through an electrical heater. It will be noted that this system differs from that shown in the drawing in that an electrical heater is utilized to heat the water in the quench bath and the thermostatic element utilized is built into the electrical heater rather than being actuated by a thermometric element immersed in the quench bath. The heated water is recycled to the water bath 15 at a sufficient rate and temperature to maintain the bath temperature at 140° F., as previously indicated. The heated water is returned to the bath through a filter maintained substantially at the position indicated by the filter 23 in the drawing. This filter is a Cuno filter manufactured by the Cuno Engineering Corporation of Meriden, Connecticut. These filters are described in said corporation's Bulletin No. 1343. The filter element utilized is a wool filter element made by said Cuno Corporation and designated by the number 2278–C1. This filter element has an opening size of 10 microns.

In the operation of the system according to this specific embodiment, a slot die having a 20-mil slot width is utilized, and a draw-down ratio of 30:1 is effected. The film withdrawn from the system as indicated at numeral 26 in the drawing is substantially completely transparent as regards visible light, i.e. it has a "see-through" rating of infinity. The film is produced at the rate of 140 pounds per hour.

When the filter 23 is eliminated from the system, the film produced is transparent, but scratches and white marks on the surface thereof are clearly evident. Use of the filter as hereinbefore described completely eliminates these scratches and white marks.

In selecting and testing suitable filters for my invention, I have found that when a 10-micron filter of the type hereinbefore described was used, the system could be maintained in operation substantially indefinitely without clogging of the filter. When a metallic filter element rated at 2 to 3 microns was installed in the circulation line returning water to the water bath from the temperature regulation unit, this filter plugged with rust and scale within several minutes. However, during the time the filter operated, the film produced was free of scratches and white marks.

Treatment of the quench water, prior to use, with zeolitic softening agents had no effect in reducing surface blemishes on the polyethylene film.

I generally prefer to utilize a filter element having an opening size in the range 5 to 100 microns, more preferably 5 to 20 microns.

Density is determined on a sample of the mass polyethylene in nonfilamentary form. The sample is prepared by compression molding of the polyethylene at a temperature of 340° F. in a mold provided with a water jacket through which water can be circulated. The sample is maintained at about 340° F. until it is completely molten. It is then cooled from 340 to 200° F. at a rate of approximately 10 Fahrenheit degrees per minute. Water is then circulated through the mold to continue the cooling to 150° F., the rate not exceeding 20 Fahrenheit degrees per minute. The polyethylene is then removed from the mold and cooled to room temperature. A small piece of the solidified polyethylene is cut from the compression molded sample and inspected to make sure that it is free of voids and that it has a sufficiently smooth surface to prevent the trapping of air bubbles thereon. The small sample is placed in a 50-ml. glass-stoppered graduate. Carbon tetrachloride and methylcyclohexane are then allowed to run into the graduate from separate burettes in such proportions that the sample is suspended in the mixed solution, i.e. it neither floats nor sinks. The graduate is shaken during the addition of liquid in order that the two liquids mix thoroughly. A total liquid volume of 15 to 20 ml. is required. After the liquids have been so proportioned that the polyethylene is suspended therein without sinking or floating, the density of the liquid mixture is equal to the density of the solid polyethylene. The polyethylene is then removed from the liquid and a portion of the liquid mixture of carbon tetrachloride and methylcyclohexane is transferred to a Westphal balance and the specific gravity of the liquid is measured at a temperature in the range of 73 to 78° F. This specific gravity is equal to the specific gravity of the polyethylene. For most practical purposes, the specific gravity can be considered identical to the density. However, if a precise conversion to actual density units (grams per cc.) is desired, this is readily referable to water at 4° F. by calculations which will readily be evident to those skilled in the art. The precision of a single specific gravity determination is ordinarily within ±.0002.

Melt index, as referred to herein, is determined according to ASTM Method D–1238–52T.

While certain structures, examples, and process steps have been particularly described herein for purposes of illustration, it is evident that the invention is not limited thereto.

I claim:

1. In a process wherein transparent polyethylene film is prepared by extruding molten polyethylene through a slot die and quenching the resulting film by immersion in a bath of water, maintaining said water at a predetermined temperature by withdrawing a stream of said water during said quenching and subjecting the withdrawn stream to heat exchange and then returning said stream to said bath, the improvement which comprises filtering said stream after said heat exchange and prior to returning said stream to said bath.

2. A process for the production of polyethylene film free of surface blemishes, which process comprises extruding molten polyethylene through a slot die, exerting tension on the extruded material and thus decreasing the thickness thereof, quenching the extruded material by immersion in a water bath maintained at a temperature in the range 135 to 160° F., continuously withdrawing and filtering without chemically treating the water in said bath during said quenching to remove suspended solid impurities therefrom, and returning the filtered water to said bath.

3. A process for the production of polyethylene film free of surface blemishes, which process comprises extruding molten polyethylene through a slot die, said polyethylene having a density at 73 to 78° F. in the range of 0.940 to 1.00 gram per cubic centimeter, exerting tension on the extruded material and thus decreasing the thickness thereof, quenching the extruded material by immersion in a water bath maintained at a temperature in the range 135 to 160° F., withdrawing a part of the water from said bath during said quenching, heating the withdrawn water, passing the thus-heated water through a filter having a pore size in the range 5 to 20 microns, and returning the heated and filtered water to said bath.

4. In a process wherein transparent film is prepared by extruding molten thermoplastic in the form of a film and quenching the resulting film by immersion in a bath of inert quench liquid, the improvement which comprises withdrawing liquid from said bath while said quenching is in progress, filtering the liquid thus withdrawn, and returning the filtered liquid to said bath.

5. In a process wherein transparent film is prepared by extruding molten thermoplastic in the form of a film and quenching the resulting film by immersion in a water bath, the improvement which comprises withdrawing water from said bath during said quenching, filtering the water thus withdrawn, and returning the filtered water to said bath.

6. In a process wherein transparent film is prepared by extruding molten ethylene polymer in the form of a film and quenching the resulting film by immersion in a water bath, the improvement which comprises withdrawing water from said bath during said quenching, filtering the water thus withdrawn, and returning the filtered water to said bath.

References Cited in the file of this patent

UNITED STATES PATENTS

| | | |
|---|---|---|
| 2,105,684 | Costa | Jan. 18, 1938 |
| 2,219,700 | Perrin et al. | Oct. 29, 1940 |
| 2,364,407 | Walker | Dec. 5, 1944 |
| 2,514,471 | Calhoun | July 11, 1950 |
| 2,807,520 | Duval | Sept. 24, 1957 |